United States Patent
Terre et al.

(10) Patent No.: US 8,077,995 B1
(45) Date of Patent: *Dec. 13, 2011

(54) INFRARED CAMERA SYSTEMS AND METHODS USING ENVIRONMENTAL INFORMATION

(75) Inventors: Bill Terre, Santa Barbara, CA (US);
Joseph Kostrzewa, Buellton, CA (US);
Jan-Erik Källhammer, Linköping (SE);
Tobias Höglund, Linköping (SE)

(73) Assignees: FLIR Systems, Inc., Wilsonville, OR (US); Autoliv Development AB, Värgärda (SE)

( * ) Notice: Subject to any disclaimer, the term of this patent is extended or adjusted under 35 U.S.C. 154(b) by 965 days.

This patent is subject to a terminal disclaimer.

(21) Appl. No.: 12/035,594

(22) Filed: Feb. 22, 2008

Related U.S. Application Data

(63) Continuation-in-part of application No. 11/064,987, filed on Feb. 23, 2005, now Pat. No. 7,340,162.

(51) Int. Cl.
*G06K 9/40* (2006.01)
*G06K 9/36* (2006.01)
*H01L 31/00* (2006.01)

(52) U.S. Cl. .................. 382/254; 382/276; 250/330

(58) Field of Classification Search ............... 382/104, 382/115, 254, 275–276, 280, 312; 396/275; 250/330, 332, 339.03, 339.1; 348/148, 164; 701/42, 65, 117
See application file for complete search history.

(56) References Cited

U.S. PATENT DOCUMENTS

| | | | |
|---|---|---|---|
| 5,083,208 A | 1/1992 | Hatanaka | |
| 5,341,142 A * | 8/1994 | Reis et al. | 342/64 |
| 5,799,106 A | 8/1998 | Mooney et al. | |
| 6,026,340 A * | 2/2000 | Corrado et al. | 701/47 |
| 6,272,411 B1 * | 8/2001 | Corrado et al. | 701/45 |
| 6,768,944 B2 * | 7/2004 | Breed et al. | 701/301 |
| 6,850,642 B1 | 2/2005 | Wang | |
| 7,027,619 B2 * | 4/2006 | Pavlidis et al. | 382/115 |
| 7,265,661 B2 | 9/2007 | Satou | |
| 7,527,288 B2 * | 5/2009 | Breed | 280/735 |
| 7,762,582 B2 * | 7/2010 | Breed | 280/735 |
| 2003/0146383 A1 | 8/2003 | Knauth | |
| 2004/0165749 A1 | 8/2004 | Holz et al. | |

FOREIGN PATENT DOCUMENTS

| | | |
|---|---|---|
| EP | 1 333 660 | 8/2003 |
| JP | 2001-154646 | 6/2001 |
| JP | 2003-164414 | 6/2003 |
| JP | 2004-123061 | 4/2004 |
| WO | WO 2004/070449 | 9/2004 |

* cited by examiner

*Primary Examiner* — Kanjibhai Patel
(74) *Attorney, Agent, or Firm* — Haynes and Boone, LLP

(57) ABSTRACT

Systems and methods provide infrared camera techniques that may improve image quality or infrared camera performance over a range of varying conditions. For example, in accordance with an embodiment of the present invention, a system is disclosed that transforms data provided by an infrared camera based upon environmental conditions at the time the data was obtained. As an example, the image quality provided by the infrared camera may be improved over a range of environmental conditions by the proper transformation of the data based upon the data and/or sensor information.

25 Claims, 2 Drawing Sheets

INFRARED CAMERA SYSTEMS AND METHODS USING ENVIRONMENTAL INFORMATION

CROSS-REFERENCE TO RELATED APPLICATIONS

This continuation-in-part patent application is related to and claims priority to U.S. patent application Ser. No. 11/064,987, filed Feb. 23, 2005 (now U.S. Pat. No. 7,340,162 B2, issued Mar. 4, 2008), which is incorporated herein by reference in its entirety.

TECHNICAL FIELD

The present invention relates generally to cameras and, more particularly, to infrared cameras and systems (e.g., for vehicle applications).

BACKGROUND

Infrared cameras are known and utilized in a variety of applications. One typical configuration of an infrared camera includes a two-dimensional array of microbolometer elements used to sense infrared radiation. Each microbolometer element functions as a pixel to produce a two-dimensional image based on detected infrared radiation. The change in resistance of each microbolometer element is translated into a time-multiplexed electrical signal by circuitry known as the read out integrated circuit (ROIC). The combination of the ROIC and the microbolometer array is commonly known as a microbolometer focal plane array (FPA) or microbolometer infrared FPA.

One drawback, for example, of a conventional infrared camera is that the infrared image provided by the ROIC, which may be stored or displayed, may not take into account the conditions at the time the infrared image was taken. As an example, the conditions may be external or internal to the infrared camera, such as for example, environmental conditions that may affect the appearance of the infrared image. As a result, there is a need for techniques that address infrared camera performance under varying environmental conditions.

SUMMARY

Systems and methods are disclosed herein to provide infrared camera techniques that may improve image quality or infrared camera performance over a range of varying conditions. For example, in accordance with an embodiment of the present invention, a system is disclosed that transforms data provided by an infrared camera based upon environmental conditions at the time the data was obtained. As an example, the system may be incorporated into a vehicle, with information regarding the environmental conditions provided by the vehicle's sensors and/or as determined based on the data provided by the infrared camera (e.g., using the infrared camera as an environmental sensor). For example, the data from the infrared camera may be analyzed, alone or with other sensor information, to provide information as to environmental conditions, with this information used to transform the data from the infrared camera. The image appearance provided by the infrared camera may be improved over a range of environmental conditions, for example, by selecting the proper transformation for the data and/or by adjustments to a display (e.g., adjusting brightness, contrast, and/or gamma) based upon the sensor's information.

More specifically, in accordance with one embodiment of the present invention, an infrared camera system includes an infrared camera adapted to provide infrared image data; and a controller adapted to process the infrared image data to determine environmental information and, based on the environmental information, to select a transformation from a plurality of transformations to apply to the infrared image data to convert the infrared image data to a lower resolution image and modify an image quality of the infrared image data.

In accordance with another embodiment of the present invention, an infrared camera system includes an infrared camera adapted to provide infrared image data; means for processing the infrared image data to determine environmental conditions associated with the infrared image data, wherein the processing means further applies a first transformation to the infrared image data based on the information on the environmental conditions to modify an image quality of the infrared image data and convert the image data to a lower resolution image; and means for displaying the infrared image data.

In accordance with another embodiment of the present invention, a method of transforming infrared camera data based on environmental conditions includes processing the infrared camera data to obtain information on environmental conditions; determining a first transformation to apply to the infrared camera data based on the environmental conditions; and applying the first transformation to the infrared camera data to convert the infrared camera data to a lower resolution image and to improve an image appearance of the infrared camera data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
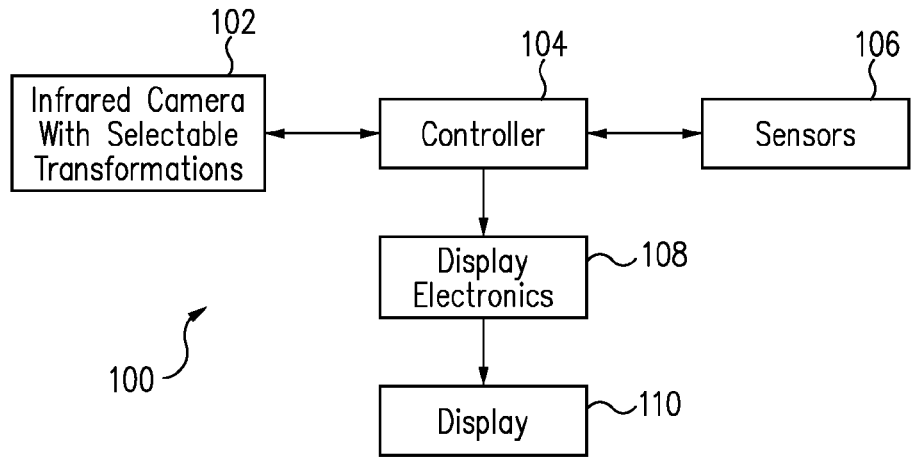
FIGS. 1a-1b show system block diagrams, which include an infrared camera in accordance with embodiments of the present invention.

FIG. 1a shows a block diagram of a system 100 in accordance with an embodiment of the present invention. System 100 includes an infrared camera 102, a controller 104, one or more sensors 106, display electronics 108, and a display 110. System 100 may be incorporated, for example, into a vehicle (e.g., an automobile or other type of land-based vehicle, an aircraft, or a spacecraft) or a non-mobile installation requiring infrared images to be stored and/or displayed. It should also be understood that system 100 may represent a portable infrared camera system (e.g., a handheld infrared camera).

Infrared camera 102 may represent any type of infrared camera, which for example detects infrared radiation and provides representative data (e.g., one or more snapshots or video infrared images). For example, infrared camera 102 may represent an infrared camera that is directed to the near, middle, and/or far infrared spectrums. Sensors 106 represent one or more various types of sensors, depending upon the desired application or implementation requirements, which provide information to controller 104.

Controller 104 communicates with sensors 106 (e.g., by receiving sensor information from sensors 106) and with infrared camera 102 (e.g., by receiving data from infrared camera 102 and providing command, control, or other information to infrared camera 102). System 100 may also include display electronics 108 and display 110, which are utilized by system 100 to display the data (e.g., infrared images) from infrared camera 102. Display electronics 108 and display 110 may receive the data from infrared camera 102 via controller 104 (e.g., a processor or other type of logic or control device), as shown, or may receive the data directly from infrared camera 102.

Display electronics 108 and display 110 may represent, for example, a cathode ray tube, a plasma display, a remote projection head-up display, or a liquid crystal display along with associated electronics (e.g., display electronics 108 and display 110 may represent a single display system). Alternatively, system 100 may store the data (e.g., within a memory of controller 104) from infrared camera 102 for later viewing (e.g., on a separate display) with display electronics 108 and display 110 optional components of system 100.

The various components of system 100 also may be combined, as desired or depending upon the application or requirements, with system 100 representing various functional blocks of a system in accordance with an embodiment of the present invention. For example, controller 104 may be combined to include display electronics 108, display 110, infrared camera 102, and/or one or more of sensors 106. Alternatively, controller 104 may be incorporated into infrared camera 102, with functions of controller 104 performed by circuitry (e.g., a microprocessor) within infrared camera 102.

As a specific implementation example, in accordance with an embodiment of the present invention, system 100 may be incorporated into a vehicle (e.g., an automobile) to display infrared images via display 110 to one or more of the vehicle's occupants. Controller 104 may represent, for example, an electronic control unit (ECU) of the vehicle. Sensors 106, which may be integrated into the vehicle, provide information on current environmental conditions to controller 104 (e.g., via a controller area network (CAN) bus protocol).

For example, sensors 106 may provide information regarding environmental conditions, such as outside temperature and/or temperature within infrared camera 102, lighting conditions (e.g., day, night, dusk, and/or dawn), humidity level, specific weather conditions (e.g., sun, rain, and/or snow), and/or whether a tunnel, a covered parking garage, or other type of enclosure has been entered or exited. As an example for measuring temperature within infrared camera 102, one or more temperature sensors may be located within infrared camera 102 (e.g., within the housing), such as one near the front by the lens or by the infrared sensor and one near the back by the electronics, to monitor the internal temperature, which may affect the image and may be dependent on environmental conditions. Sensors 106 may represent conventional sensors as would be known by one skilled in the art for monitoring various conditions (e.g., environmental conditions) that may have an effect (e.g., on the image appearance) on the data provided by infrared camera 102.

In accordance with an embodiment of the present invention, sensors 106 (e.g., one or more of sensors 106) may also represent devices that relay information to controller 104, with the information received by sensors 106 provided, for example, via wireless communication. For example, sensors 106 within the vehicle may receive information from a satellite, through a local broadcast (e.g., radio frequency) transmission, through a mobile or cellular network, and/or through information beacons in an infrastructure (e.g., a transportation or highway information beacon infrastructure) or other wired or wireless techniques.

The information provided by sensors 106 may be evaluated and utilized by controller 104 to determine the proper operational parameters or settings for infrared camera 102. For example, by using the information provided by sensors 106 (e.g., the vehicle's sensors) regarding external environmental conditions, the most appropriate transformation may be selected (e.g., by controller 104 or infrared camera 102) and applied to the data generated by infrared camera 102. The transformation of the data, for example, may occur in infrared camera 102, in display 110, in an intermediate device (e.g., display electronics 108), or in some combination of these. Alternatively, or in addition, parameters (e.g., brightness, contrast, and/or gamma) of display 110 may be adjusted (e.g., by controller 104 directly or via display electronics 108) based on information provided by sensors 106 regarding external environmental conditions.

Specifically, in accordance with an embodiment of the present invention, the optimization of the data (e.g., image or video image) from infrared camera 102 may require the generation and/or application of a specific transformation on the data. The transformation will transform the data from a higher to a lower resolution image (e.g., to a lower gray scale resolution). For example, if infrared camera 102 provides 14-bit data, the transformation may translate the 14-bit data to 8-bit data, with the transformation applied based on the driving or environmental conditions (e.g., based on the information from the sensors 106). Consequently, by selecting and applying the most appropriate transformation to the data generated by infrared camera 102, an improved image appearance may be obtained and stored and/or displayed as compared to the image appearance that would have resulted from a single, universal transformation applied for all environmental conditions or regardless of environmental conditions.

Infrared camera 102, for example, may store a number of selectable transformations that may be applied to the data generated by infrared camera 102 or controller 104 may generate and/or store the selectable transformations and apply the selected transformation to the data provided by infrared camera 102. As an example, based on the information provided by sensors 106, controller 104 may determine the appropriate transformation corresponding to the environmental conditions and command the transformation to be applied by infrared camera 102 (e.g., via a local interconnect network (LIN) protocol between infrared camera 102 and controller 104). Alternatively or in addition, information regarding environmental conditions may be determined from the infrared camera data, with this information used to determine the appropriate transformation to apply to the infrared camera data.

Figure 1B:
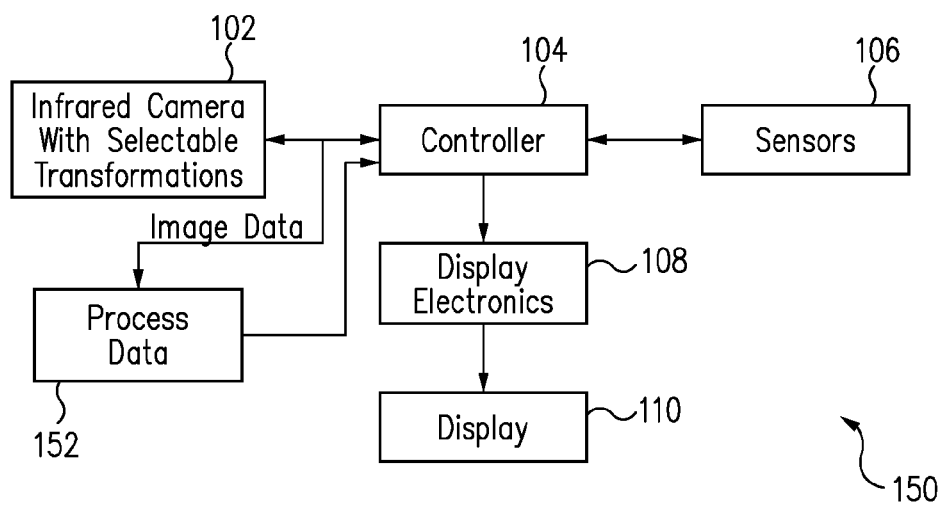

For example, FIG. 1b shows a block diagram of a system 150 in accordance with an embodiment of the present invention. System 150 is similar to system 100 (FIG. 1a), but further illustrates that the data (e.g., image data) from infrared camera 102 may be analyzed (e.g., processed as shown in functional block 152) to determine environmental information, which may be used as discussed herein to select the appropriate transformation to apply to the infrared camera data.

As discussed similarly for system 100, it should be understood that the various components of system 150 may be combined, as desired or depending upon the application or requirements, with system 150 representing various functional blocks of a system in accordance with an embodiment of the present invention. For example, the processing of the image data (block 152) may be performed by infrared camera 102, controller 104 separately, or by controller 104 incorporated within infrared camera 102.

As an example in accordance with an embodiment, the image data may be processed (block 152) by analyzing the image data's histogram to determine environmental information (e.g., environmental conditions of the captured image). For example, the dynamic range may be determined by measuring the histogram width of the captured image from infrared camera 102. A narrow width for the histogram may indicate, for example, fog or other type of low contrast environmental condition, while a wide width for the histogram may indicate a high contrast environmental condition (e.g., a clear, sunny day), as would be understood by one skilled in the art. It would also be understood that, for example, when measuring the histogram width, typically a fraction of the most intense values and a fraction of the least intense values may be excluded for measurement purposes.

Figure 2:
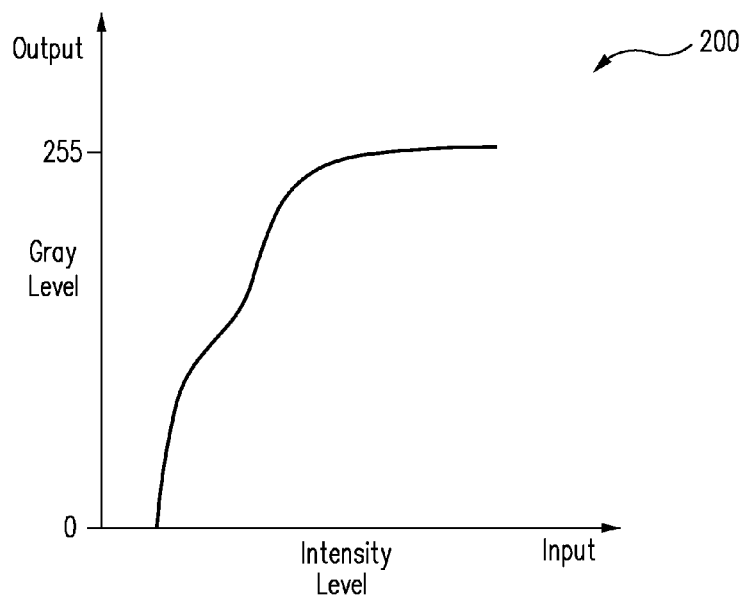
FIG. 2 illustrates an example of an input-to-output transformation that may be applied to data from the infrared camera of FIG. 1a and/or FIG. 1b in accordance with one or more embodiments of the present invention.

FIG. 2 illustrates an example of an input-to-output transformation 200 that may be applied to data from infrared camera 102 of FIG. 1a and/or FIG. 1b in accordance with one or more embodiments of the present invention. Transformation 200 is shown plotted on a graph having an input axis of intensity level (e.g., analog or digital) and an output axis of gray level (e.g., digital output).

Transformation 200 may be applied, for example, to every pixel of the image data from infrared camera 102. Furthermore, transformation 200 may represent one of a number of selectable transformations that may be applied to the infrared camera data based on environmental information obtained from the infrared camera data and/or from sensors 106, as discussed herein and as would be understood by one skilled in the art. Consequently, after application of transformation 200 (or application of one of the other selectable transformations) to the infrared camera data, the infrared camera data will have a different histogram relative to the histogram of the infrared camera data prior to the application of transformation 200 (e.g., histogram conversion). In accordance with an embodiment, a transformation may also be selected and applied based on environmental conditions, with the selected transformation indicating the type of display palette (e.g., a red palette for a dark environment or a black and white palette for a bright environment) to provide to display the transformed image data, as would be understood by one skilled in the art.

The histogram of the infrared camera data after application of the selected transformation (e.g., transformation 200) will depend on the histogram of the infrared camera data before application of the selected transformation and on the particular transformation selected (e.g., based on environmental conditions). Thus, a transformation 200 may be designed (e.g., transformation 200 or one of a number of transformations that may be selected) to obtain a desired output or resulting histogram after application of the transformation. For example, the resulting histogram, after application of the transformation, may be as shown in FIGS. 3-5.

Figure 3:
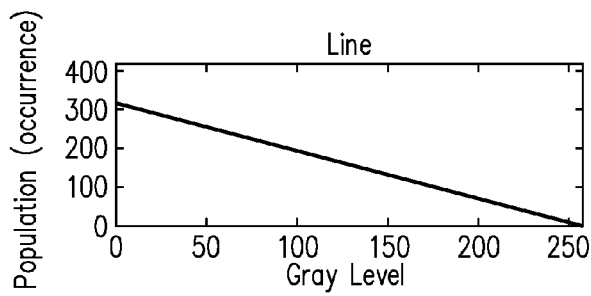
FIGS. 3 through 5 illustrate graphs for exemplary transformations for the infrared camera or exemplary output histograms for the infrared camera data of FIG. 1a and/or FIG. 1b in accordance with embodiments of the present invention.
Figure 4:
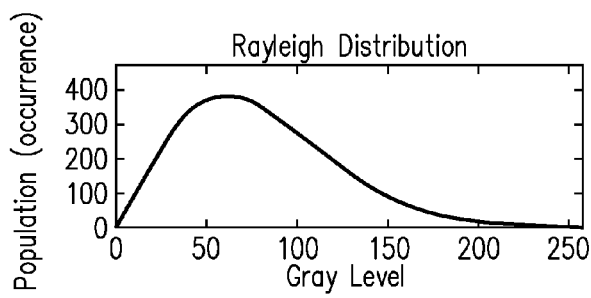
Figure 5:
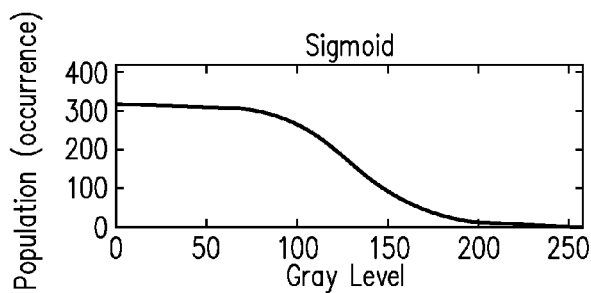

Specifically, FIGS. 3 through 5 illustrate graphs for exemplary transformations or output histograms (after application of the histogram conversion transformation) for the data generated by infrared camera 102 of FIG. 1a and/or 1b in accordance with an embodiment of the present invention. It should be understood that FIGS. 3-5 show only a few examples of the numerous transformations or alternatively output histograms that may be desired, as would be understood by one skilled in the art. Additionally, each selectable transformation may be based on a composition of simpler transformations (e.g., with parameters based on the desired selectable transformation), which may be applied to generate the desired output histogram. Furthermore in accordance with an embodiment, spatial transformations may be performed before and/or after histogram conversion (e.g., application of the selected transformation).

As an example, FIG. 3 illustrates an exemplary linear (ramp down) transformation or desired output histogram, which for example may be selected for daylight, dusk, or dawn environmental conditions. The linear transformation (or output histogram) may be represented by equation (1), where "k" equals the slope and "m" equals an offset. The value of "k" may be selected (e.g., a positive or a negative slope or no slope) for the linear transformation to provide a more optimal image appearance as a function of differing environmental conditions.

$$y(x)=kx+m \quad (1)$$

FIG. 4 illustrates an exemplary Rayleigh transformation or Rayleigh distribution-shaped output histogram, which for example may be selected for night or extended night-like environmental conditions. The Rayleigh transformation (or output histogram) may be represented by equation (2), where "s" equals the location of the peak.

$$y(x) = \frac{xe^{-x^2/2s^2}}{s^2} \quad (2)$$

FIG. 5 illustrates an exemplary Sigmoid transformation or Sigmoid distribution-shaped output histogram, which for example may be selected for when system 100 (e.g., the vehicle having system 100 in the specific example) enters a tunnel, a parking garage, or other type of enclosure or similar sudden change in environmental conditions. The Sigmoid transformation (or output histogram) may be represented by equation (3), where "a" equals the slope.

$$y(x) = 1 - \frac{1}{1+e^{-ax}} \quad (3)$$

Additional logic or further transformation of the data may be performed based on information provided by sensors 106. For example, the particular transformation or output histogram (e.g., Rayleigh) may be altered, distorted, or skewed as desired to change or further enhance the image appearance as a function of the environmental conditions.

Furthermore, it should be understood that the transformations and output histograms illustrated are exemplary and that a wide variety of transformations and histograms (e.g., piecewise linear, Gaussian, or inverse Sigmoid or transformation permutations and variations) may be employed, as would be understood by one skilled in the art based on the techniques discussed herein. For example, in accordance with one or more embodiments of the present invention, various types of transformation techniques (e.g., histogram or spatial transformations, including for example histogram specifications, histogram projections, histogram regressions, and/or histogram equalizations) may be applied to the data generated by infrared camera 102 based on environmental information provided by sensors 106 and/or extracted from the image data from infrared camera 102.

Additionally, or as an alternative, display settings for display 110 may be adjusted based on environmental information provided by sensors 106 and/or extracted from the image data from infrared camera 102. For example, controller 104 (directly or via display electronics 108) may adjust one or more settings of display 110 based on environmental information provided by sensors 106 and/or extracted from the image data from infrared camera 102. For example, controller 104 may adjust a brightness setting, a contrast setting, a palette setting (e.g., red palette for dusk and at night, black and white palette for day), and/or a gamma setting of display 110. Thus, for example, an image optimization algorithm may be performed by controller 104 to control infrared camera 102 and/or display 110 to optimize the data and/or the image appearance based on environmental information.

As an example for the techniques discussed above, if rain is detected or if, due to other environmental conditions, there is a low dynamic range of the image data from infrared camera 102, a different transformation may be selected or the transformation applied may have one or more of its parameters adjusted to account for the environmental condition. Alternatively, or in addition, the display setting of display 110 may be adjusted to enhance the appearance of the images being displayed (e.g., palette selection, and/or brightness, contrast, and/or gamma incremented by one or two increments). Furthermore, interpolation may be performed to smoothly transition when switching from the application of one transformation to another as applied to the data generated by infrared camera 102 or when changing the display settings of display 110.

The display settings of display 110 may also be determined based on the selected transformation and/or the current environmental conditions. For example, the brightness and contrast settings of display 110 may be adjusted to −3 and +3, respectively, from their nominal values when the linear transformation is applied. As another example, the brightness and contrast settings of display 110 may be adjusted to +3 and −3, respectively, from their nominal values when the Rayleigh transformation or the Sigmoid transformation is applied. As another example, the display (e.g., palette or colors) may transition from a black and white display during brightly lit environments (e.g., during the day) to a red display during a dark environment (e.g., dusk, at night, or in a tunnel or darkened environment).

In accordance with one or more embodiments of the present invention, an infrared camera is disclosed that can apply logic selectively to transform the data generated by the infrared camera to account for changing environmental conditions. The infrared image quality may be improved for system operation over a wide range of scene environments (e.g., environmental conditions).

For example, in accordance with an embodiment of the present invention, an infrared camera system is disclosed that is incorporated into a vehicle. A processor on the vehicle (e.g., the vehicle's electronic control unit or within the infrared camera) includes switching logic (i.e., decision logic) that generates and/or selects the most appropriate transform, based on information from the vehicle's sensors and/or based on information extracted from the data from the infrared camera, to be applied to the data generated by the infrared camera.

The vehicle's sensors may provide information, such as for example day or night, dusk or dawn, whether the vehicle has entered a covered structure (e.g., a tunnel), and/or the specific weather condition (e.g., sun, rain, or snow). Additionally, the vehicle's sensors may provide information as to the type of environment, such as for example highway (or motorway), countryside (rural), city (urban), or residential area. For example, one or more of sensors 106 may represent a global positioning system (GPS) receiver or other type of location determining device, which may provide information as to the vehicle's position and the type of environment (e.g., exploiting data from geographical information systems (GIS)). Furthermore as an example, the type of environment may also be determined by analyzing the image data from the infrared camera. Consequently, the selected transformation (and possibly other data processing functions for the infrared camera data) may be based at least partly on the type of environment during which the infrared camera data was obtained. Thus, the processor may select one from among a number of data transforms to apply to the data generated by the infrared camera (e.g., determines the mode for the infrared camera) based on the information from the vehicle's sensors (e.g., sensors 106 and/or by use of the infrared camera as a sensor).

Consequently, the infrared images being displayed may be dynamically optimized (i.e., in real time) by applying the appropriate transform to the data based on real-time sensor information (e.g., environmental conditions). When switching from the application of one transform to another transform as the environmental conditions change, the infrared camera may interpolate from one mode to the next (e.g., interpolation from one transform to the next) so that a gradual rather than a sudden change occurs in the images being displayed. Furthermore, display settings may be automatically adjusted (e.g., optionally with interpolation between the display setting changes) based on the environmental conditions or on the selected transformation to further enhance the images being displayed.

Furthermore in addition to selecting a transformation to apply to the input histogram to obtain a desired output histogram, as discussed herein in accordance with some embodiments, high-pass filtering may also be selected based on the width of the histogram from the infrared camera (e.g., prior to the application of the transformation) in accordance with an embodiment of the present invention. For example, the degree and other parameters of the high-pass filtering may be based on the input histogram width. As a further example, various parameters of the high-pass filtering, such as kernel size, cut-on frequency, and/or filter strength (e.g., what fraction of the low-frequency content is added back), may be varied as a function of scene/environmental conditions. Additionally or alternatively in accordance with an embodiment, high-pass filtering may be based on vehicle movement (e.g., speed and/or rate of change of direction) as determined by sensors 106 (e.g., GPS information as discussed herein).

Embodiments described above illustrate but do not limit the invention. It should also be understood that numerous modifications and variations are possible in accordance with the principles of the present invention. Accordingly, the scope of the invention is defined only by the following claims.

We claim:

1. An infrared camera system comprising:
an infrared camera adapted to provide infrared image data; and a controller adapted to process the infrared image data to determine environmental information and, based on the environmental information, to select a transformation from a plurality of transformations to apply to the infrared image data to convert the infrared image data to a lower resolution image and modify an image quality of the infrared image data.

2. The infrared camera system of claim 1, further comprising at least one sensor adapted to provide additional environmental information, and wherein the controller selects the transformation based on the environmental information determined from the infrared image data and based on the additional environmental information from the at least one sensor.

3. The infrared camera system of claim 2, wherein the infrared camera system is incorporated into a vehicle, and wherein the at least one sensor further provides environmental information as to an environment type.

4. The infrared camera system of claim 2, wherein the controller is further adapted to select a different transformation from the plurality of transformations based on changes to the environmental information provided by the at least one sensor and/or determined by the processing of the infrared image data.

5. The infrared camera system of claim 2, wherein the environmental information and the additional environmental information comprise at least one of a temperature, a light level, a humidity level, a type of environment, and a specific weather indication.

6. The infrared camera system of claim 1, wherein the plurality of transformations comprise at least one of a linear, a Rayleigh, a Sigmoid, a piece-wise linear, a Gaussian, and an inverse Sigmoid.

7. The infrared camera system of claim 1, wherein the plurality of transformations comprise at least one of a histogram specification, a histogram projection, a histogram regression, and a histogram equalization.

8. The infrared camera system of claim 1, further comprising a display adapted to show images based on the infrared image data, and wherein the controller is further adapted to select a display palette for the display based on at least one of the transformations selected and the environmental information.

9. The infrared camera system of claim 8, wherein the controller is further adapted to adjust at least one of a brightness, a contrast, and a gamma setting of the display based on at least one of the transformations selected and the environmental information.

10. The infrared camera system of claim 1, wherein interpolation is performed when switching from a first transformation to a second transformation from the plurality of transformations.

11. The infrared camera system of claim 10, wherein the infrared camera comprises a far infrared camera.

12. An infrared camera system comprising:
an infrared camera adapted to provide infrared image data;
means for processing the infrared image data to determine environmental conditions associated with the infrared image data, wherein the processing means further applies a first transformation to the infrared image data based on the information on the environmental conditions to modify an image quality of the infrared image data and convert the image data to a lower resolution image; and
means for displaying the infrared image data.

13. The infrared camera system of claim 12, further comprising means for providing information on the environmental conditions associated with the infrared image data to the processing means.

14. The infrared camera system of claim 13, wherein the information providing means comprises a wireless interface for receiving the information from at least one of a satellite, a radio broadcast, a cellular transmission, and a road side beacon, and wherein the information is used to determine an environment type.

15. The infrared camera system of claim 13, wherein the processing means selects from among a number of possible transformations to provide as the first transformation based on the information on the environmental conditions, and wherein the processing means further selects a different transformation to apply to the infrared image data based on changes to the information on the environmental conditions.

16. The infrared camera system of claim 12, further comprising means for adjusting at least one of a brightness, a contrast, a display palette, and a gamma setting of the displaying means based on the environmental conditions.

17. The infrared camera system of claim 12, wherein the environmental conditions comprises at least one of a temperature, a light level, a humidity level, and a specific weather condition, wherein the infrared camera system is incorporated into a vehicle, and wherein the processing means is further adapted to apply a high-pass filter to the infrared image data based on at least one of the information on the environmental conditions and a movement of the vehicle.

18. The infrared camera system of claim 12, wherein the processing means is further adapted to interpolate between the first transformation and a second transformation selected from a plurality of transformations to apply to the image data.

19. A method of transforming infrared camera data based on environmental conditions, the method comprising:
processing the infrared camera data to obtain information on the environmental conditions;
determining a first transformation to apply to the infrared camera data based on the environmental conditions; and
applying the first transformation to the infrared camera data to convert the infrared camera data to a lower resolution image and to improve an image appearance of the infrared camera data.

20. The method of claim 19, further comprising receiving information based on the environmental conditions, and wherein the determining of the first transformation includes selecting the first transformation based on the environmental conditions from among a number of available transformations.

21. The method of claim 20, further comprising:
determining an environment type for the environmental conditions based on the information received; and
applying high-pass filtering to the infrared camera data based on the environmental conditions.

22. The method of claim 19, wherein the first transformation comprises at least one of a histogram specification, a histogram projection, a histogram regression, and a histogram equalization.

23. The method of claim 19, further comprising displaying the infrared camera data after the applying of the first transformation.

24. The method of claim 23, further comprising adjusting at least one of a brightness setting, a contrast setting, a display palette, and a gamma setting for the infrared camera data being displayed based on the environmental conditions.

25. The method of claim 19, further comprising:

determining a second transformation to apply to the infrared camera data when the environmental conditions change;

applying the second transformation to the infrared camera data; and interpolating from the first to the second transformation when the applying of the second transformation is performed.

* * * * *